Nov. 25, 1930.  E. V. AMY  1,782,399
ABSORPTION OF SOUND
Filed Oct. 5, 1929
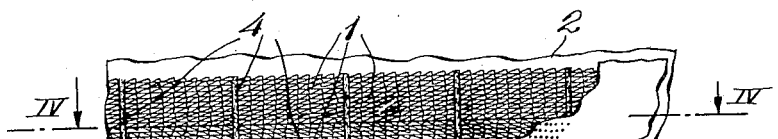
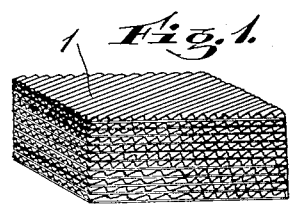
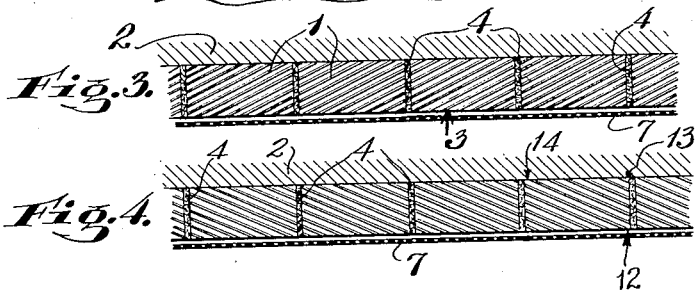
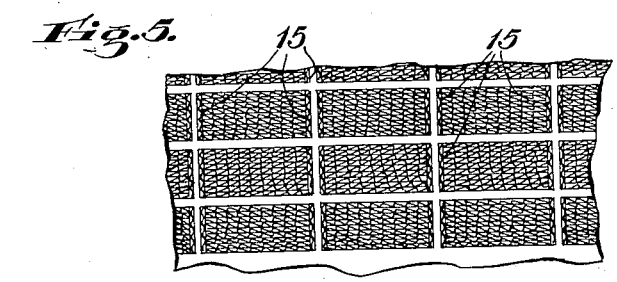
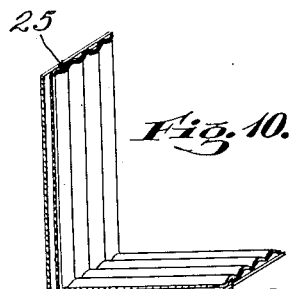
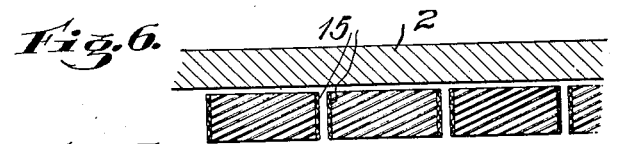
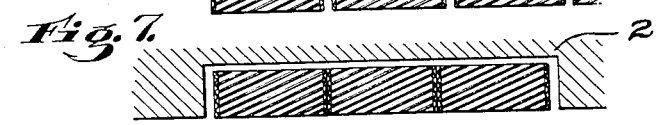
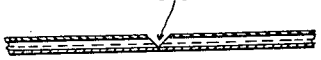
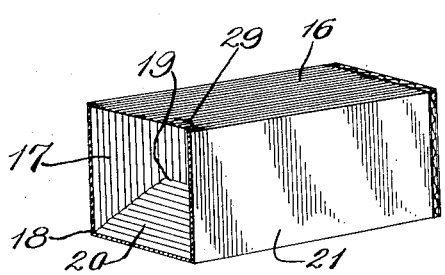
INVENTOR.
Ernest V. Amy
BY Jeffery Kimball & Eggleston
ATTORNEYS.

Patented Nov. 25, 1930

1,782,399

UNITED STATES PATENT OFFICE

ERNEST V. AMY, OF NEW YORK, N. Y., ASSIGNOR TO AMY, ACEVES & KING, INC., OF NEW YORK, N. Y., A CORPORATION OF NEW YORK

ABSORPTION OF SOUND

Application filed October 5, 1929. Serial No. 397,487.

It has been recognized that sound energy may be absorbed to a considerable degree, or the absorption of sound energy by a wall or structure considerably increased, by providing the wall or structure with a large number of pipe-like apertures or cells, of greater diameter than the natural pores of the structure, and of relatively greater length than diameter or width, pierced into the wall at right angles to the face of the latter. It has also been recognized that the sound-absorbing capacity of such apertures or cells is limited.

I have discovered that it is not essential to their functioning that these apertures or cells be arranged at right angles to the face of the wall, and that it is not essential to their functioning that these apertures or cells be straight throughout their lengths; and that a still larger part of the sound energy reaching them, and sounds of lower pitches than is possible to absorb otherwise, can be absorbed by making the apertures or cells, or some of them, considerably longer than has been the practice heretofore, and, specifically, of lengths greater than it is possible to obtain, within the limits of permissible and desirable thicknesses of wall or absorbing material, if the apertures or cells are both straight and pierced at right angles to the face of the wall.

According to my invention, I so dispose the apertures, cells or pipes, or so many of them as may be convenient or necessary to obtain the desired result, that they have, each, a component of their length parallel to the surface of the wall to which comes the sound energy to be absorbed. Thereby I am able, as and when necessary or desirable, to make the apertures or cells of lengths greater than the thickness of the wall or absorbing structure. Lengths longer than the thickness of the wall can be obtained by simply placing the apertures or cells diagonally as it were; that is to say, at angles to the face of the wall which are less than right angles; or the apertures or cells can be bent as curved intermediate their two ends.

My invention also concerns apertures or cells of various and varying widths, diameters or cross-areas as hereafter explained.

The accompanying drawings illustrate various forms of my invention, and further matters related to my invention and its use appear hereinafter: Fig. 1 is a perspective of a sound-absorbing block or unit embodying my invention in which the apertures, cells or pipes are straight and placed diagonally to the face. Figure 2 is an elevation of an assembly of a number of these blocks or units against a room wall for the suppression of echoes and the reflection of sound. Fig. 3 is a plan view of the structure of Fig. 2. Figure 4 is a sectional view of the structure of Fig. 2 on the line IV—IV, looking in the direction of the arrows. Figure 5 is an elevation, and Fig. 6 is a sectional plan view of the structure of Fig. 5, illustrating a slightly modified form of my invention. Figure 7 is a sectional view through a wall and an assembly of the blocks of Figs. 5 and 6, illustrating still another arrangement. Figure 8 is a perspective of a block embodying my invention in which the apertures, cells or pipes are bent. Figs. 9 and 10 are details illustrating the construction thereof.

As will be understood by those skilled in this art, the pipe-like apertures or cells may have various forms in cross-section, both regular and irregular, varying, as it were from narrow slots to cylindrical forms, and may be formed in any one of a number of ways and in a variety of materials. Also the number of apertures or cells per unit area of wall surface may vary. For general use however, I believe it preferable that there be such a large number of apertures or cells that they are separated one from another by only thin walls, and that they be formed in a more or less porous material; furthermore, I believe that the material should be of such a nature as will permit the walls or wall surfaces of the apertures or cells to be deformed or "worked" by those alternate compressions and rarefactions of the air within the cells which constitutes sound, so that energy of the wave motion may be absorbed by internal friction within the material itself; and still further that the material is preferably one which has fuzzy surfaces, so as to impose some frictional impedance on the movement of air within the apertures or cells. Consonant with these ideas and as a generally convenient form of construction, suitable material in the form of corrugated sheets may be built up in the form of blocks, as many of which will be assembled together as may be necessary to cover the desired area, as herein illustrated. Corrugated cardboard, such as is commonly employed in the manufacture of boxes and cartons, may be used; corrugated asbestos board is another good material. It will be understood however that my invention is not altogether limited to the particular materials or to the block-form of construction here mentioned.

By so placing the pipe-like apertures, cells or pipes that a component of their lengths is parallel to the face of the wall to which the sound comes, apertures of greater length than the thickness of the wall or absorbing structure can be obtained in various ways. For example, straight apertures, cells or pipes may be employed by placing the same at a more or less acute angle to that surface of the wall; the more acute the angle the greater may be the length of the longest aperture for any given thickness of wall. By using conjointly therewith partitions more or less at right angles to the same face of the wall, apertures, cells or pipes of various suitable lengths can be obtained. Thus as illustrated in Fig. 1, corrugated sheets, for example single faced corrugated sheets, may be cut into more or less rectangular sections through which the corrugations extend diagonally at a suitable angle to give the desired maximum length of aperture or cell within the designed width of sheet and thickness of the absorbing structure, and a number of these piled up and cemented together to form a block 1 of desired vertical depth. In order that the sound may not be transmitted through an aperture or apertures from one face of the block to the other, I usually make such blocks of such length that one end of each aperture is at one face of the block and the other is at one end of the block as appears in Fig. 1; other means for accomplishing or approximating the same result can be resorted to however. Such blocks may be employed in various ways, as will be understood by those skilled in this art. For example, they may be applied to or stacked against and in front of the plane face of a wall 2 to restrain the reflection of sound therefrom and echo, as illustrated in Figs. 2, 3 and 4. Vertical strips 4 of felt, porous asbestos, or other sound-absorbing or non-sound-transmitting material, close one end of each aperture and by breaking up all aperture-continuity from block to block cause the apertures of each block to function as apertures of various lengths as intended. While those faces of the blocks opposite the wall 2, i. e. the faces 3 to which the undesired sounds come (these sounds are here assumed to come in the direction of the arrow, Fig. 3) will be open of course, at least in effect, to permit the entry of the sound energy into the air within the apertures, it is not necessary that they be exposed either physically or visually; the openings into the apertures may be covered for decorative or other purposes so long as the covering is such as permits the sound energy to reach the blocks. Thus for example a diaphragm 7, such as a thin sheet of aluminum perforated with a multitude of holes 8 may be suspended in front of the stack of blocks; and for example this aluminum sheet 7 may be colored as the interior treatment of the room may require.

As and where necessary or desirable, to enlarge or reduce the absorption of certain frequencies for example, apertures, cells or pipes of different widths, diameters or cross-areas may be intermixed, the larger widths promoting and the smaller widths restraining movement of the air within the aperture, cell or pipe and hence to an extent respectively reducing or enlarging the amount of sound energy absorbed per unit area. This I have illustrated in Fig. 1 by way of example, where, it will be observed, the longer apertures, cells or pipes of the left hand ends of the lower corrugated layers are of greater widths or cross-areas than the others of the same block. This feature is more important in connection with the use of longer pipes than have been employed heretofore I believe, but to an extent is independent thereof as will be observed.

Preferably, I believe, the long and short pipe-like apertures or cells should be more or less intermixed. To a certain extent, intermixing is obtained by the corrugated construction I have described; that is to say, the apertures, cells or pipes of each corrugated layer of the block of Fig. 1 are of various lengths. Further intermixing can be done with respect to each two adjacent layers of the corrugated board; for example the corrugations in alternate layers of board in the block of Fig. 1 may extend in opposite directions. I contemplate however that such thorough intermixing will usually complicate manufacture unnecessarily, and hence by preference I let the corrugations all run the same way in each block, and then so lay the blocks that the openings into the long pipes or cells of one block lie adjacent the openings into the short pipes or cells of adjacent blocks. Thus the blocks of the first or top row of Fig. 2 may be so placed that all their corrugations are parallel with each other as shown in Fig. 3, while the blocks of the next row are reversed relatively to the blocks of the first row so that the corrugations thereof run in the opposite directions as shown in Fig. 4; and the succeeding rows are reversed alternately in the same manner.

From Figs. 3 and 4, it will be observed that a part of the pipe-like apertures or cells of each block are entirely closed by the wall 2 and the strips 4 jointly, so that no sound energy passes directly into them; that is to say, for example, that part of one of the blocks of Fig. 4 contained within the triangular area 12, 13 and 14. The corresponding part of each block might be absent so far as functioning of its cells in the manner hereinbefore described is concerned. The whole of each rectangular block may be made to act in the described manner however, by so arranging the blocks that the sound energy can enter one or the other of the ends of all of the pipes or cells. Thus, for example, as shown in Figs. 5 and 6, the blocks may be spaced apart from each other in all directions, and likewise spaced from the face of the wall 2. Sound energy is thus permitted to pass between blocks, and thence between the blocks and the face of the wall 2, and thereby gain direct entrance to the pipe-like apertures or cells within the area indicated by 12, 13 and 14 in Fig. 4 and similar portions of the other blocks of the assembly. Individual closures for their ends may be applied to the blocks (in lieu of strips 4) as indicated by the vertical pieces 15 of double faced corrugated material.

In a relatively small area, in a wall recess for example, the same result may be accomplished without spacing the blocks apart, as illustrated in Fig. 7. Here it will be seen that while the blocks are placed close together as in Figs. 2, 3 and 4 for example, they are spaced as a group from the ends of the recess and from the portion of the wall 2 forming the base or back of the recess.

Fig. 8 illustrates a form of block in which pipe-like apertures, cells or pipes longer than the thickness of the structure, are obtained by bending the apertures, cells or pipes, as it were. From the face 16 to the plane 18—19 (the block is to be so laid that the sound comes to the face 16) various of the apertures, cells or pipes extend at right angles to the face 16; from the plane 18—19 the apertures, cells or pipes are continued parallel to the face 16. Rows of these bent apertures or cells are nested together. To form such a block of corrugated board for example, a number of boards may be assembled into two stacks 17 and 20 and one side of each stack cut at an appropriate angle, complementary to the angle of the cut of the other, so that when the two are joined as at 18—19 the right angular form of apertures or cells is obtained. The two stacks or groups of board may be fastened together in various ways, as will be obvious. An individual layer 21 of corrugated board or felt, etc., may be added to close one end of the pipes of each block, or common strips employed, such as 4 before described. Ordinarily I contemplate that the angle of the surface represented by 18—19 will be forty-five degrees, since this angle of forty-five degrees permits the cell ends which are at right angles to the face 16, to join individually with the ends which are parallel to that face to form individually continuous or non-intersecting cells or pipes, each L-shaped; when the cut is made at any other angle, the cell ends at one side of the juncture will not join evenly and individually with the cell ends at the opposite side, but the cells will intercept each other to a certain degree. Instead of assembling the corrugated sheets in two stacks and making the cuts as before described however, I prefer to employ the construction illustrated in Figs. 9 and 10. That is to say, first cutting the separate corrugated sheets to the proper various lengths, i. e. each of such length as to nest with its neighbors without projecting beyond the common faces of the block, I then notch the corrugations of each sheet with two opposite forty-five degree cuts as illustrated at 24 in Fig. 9. I then bend the corrugated sheets at these right-angled notches so that the two ends of each sheet are at right angles to each other as shown in Fig. 10. When a group of these right angled boards are nested together, the individual apertures, cells or pipes are individually continuous as will be apparent; that is to say, for example, the pipe or cell beginning at point 25 in Fig. 10 is continuous to and closed against all other pipes or cells up to its opposite end 26.

In making up such blocks or wall structures of right angled apertures or cells, it is not usually necessary to carry the right angled form throughout them. Having made such a part of the block or structure of L-shaped cells or pipes as is necessary in view of the quantity of long pipes needed, I usually complete each block by a few straight cells or pipes as indicated by the group 29 in Fig. 8.

It will be understood that my invention is not limited to the details herein illustrated and described, except as appears hereinafter in the claims.

I claim:

1. A structure pierced with a multiplicity of cells respectively of greater length than width and open to permit the entry of sound energy into the air within them, each of said cells having a component of its length parallel to that face of the structure to which comes sound to be absorbed, and there being such a number of cells per unit volume of the structure as to absorb a material amount of the sound reaching the said face of the structure.

2. A structure pierced with a multiplicity of cells respectively of greater length than width, each said cell having one end open to permit the entry of sound energy into the air within it and having its other end closed and having a component of its length parallel to that face of the structure to which comes sound to be absorbed, and there being such a number of cells per unit volume of the structure as to absorb a material amount of the sound reaching the said face of the structure.

3. A structure pierced with a multiplicity of cells respectively of greater length than width, each of said cells having a component of its length parallel to that face of the structure to which comes sound to be absorbed, some of said cells having a length greater than the thickness of the structure, each of said cells having one end open at said face of the structure to permit the entry of sound energy into the air within them and having their opposite ends closed, and there being such a number of cells per unit volume of the structure as to absorb a material amount of the sound reaching the said face of the structure.

4. The subject matter of claim 1, characterized by the fact that said multiplicity of cells includes cells of different widths.

5. The subject matter of claim 2, characterized by the fact that said cells include cells of different widths.

6. A structure pierced with a multiplicity of cells of various different widths, respectively of greater length than width, and open to permit the entry of sound energy into the air within them, there being such a multiplicity of cells per unit volume of the structure as to absorb a material amount of the sound reaching the structure.

7. The subject matter of claim 1, characterized by the fact that said multiplicity of cells includes cells of different lengths.

8. The subject matter of claim 1, characterized by the fact that said multiplicity of cells includes cells of different lengths and cells of different widths.

9. The subject matter of claim 1, characterized by the fact that the structure is composed of a porous material.

10. The subject matter of claim 1, characterized by the fact that the walls of the cells are composed of a fuzzy material.

11. The subject matter of claim 1, characterized by the fact that the said multiplicity of cells includes cells of different widths, and that there is a fuzzy material within the cells of greater width.

12. The subject matter of claim 3, characterized by the fact that said multiplicity of cells includes cells of different lengths and that said structure comprises a readily transportable unit adapted to be assembled with other similar units to absorb sound coming to a larger area.

In testimony whereof, I have signed this specification.

ERNEST V. AMY.